E. W. ADAMS.
PORTABLE WOOD SAWING MACHINE.
APPLICATION FILED NOV. 25, 1919.
1,364,054.
Patented Dec. 28, 1920.
3 SHEETS—SHEET 3.
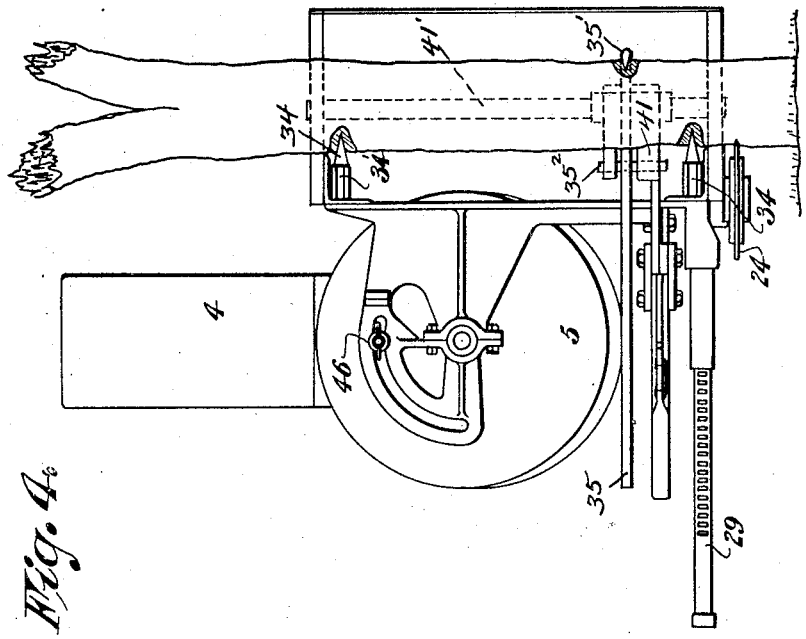
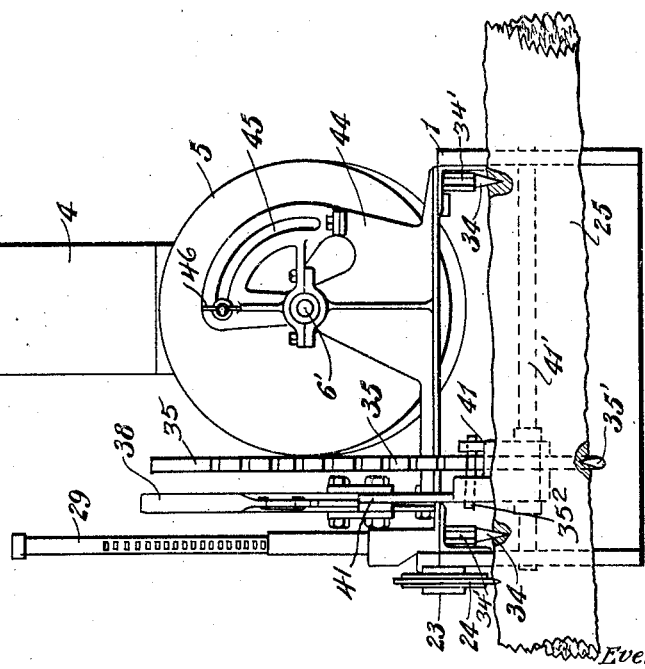
INVENTOR.
Everett W. Adams,
BY Harry W. Bowen
ATTORNEY.

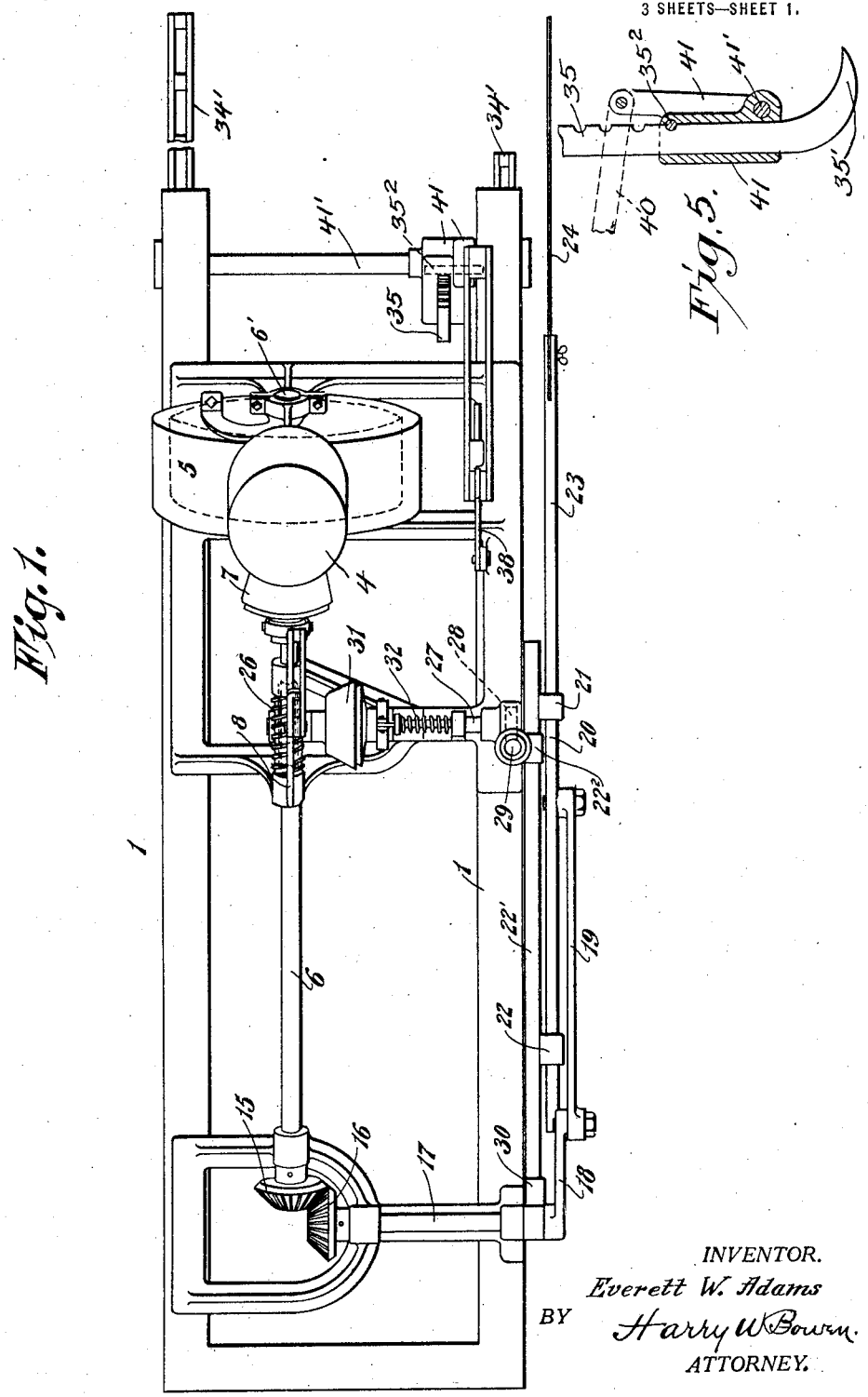

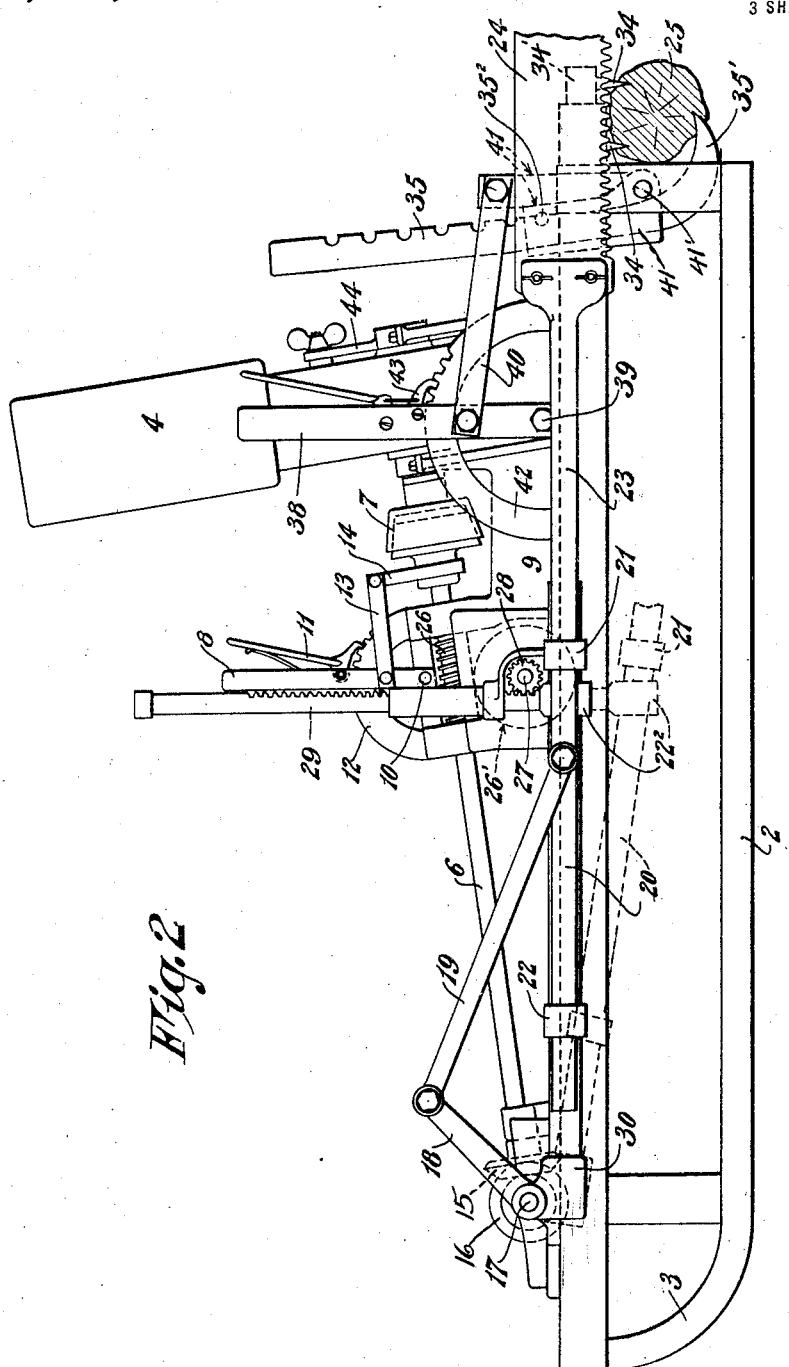

UNITED STATES PATENT OFFICE.

EVERETT W. ADAMS, OF ADAMS, MASSACHUSETTS.

PORTABLE WOOD-SAWING MACHINE.

1,364,054.      Specification of Letters Patent.      Patented Dec. 28, 1920.

Application filed November 25, 1919. Serial No. 340,529.

*To all whom it may concern:*

Be it known that I, EVERETT W. ADAMS, a citizen of the United States of America, residing at Adams, in the county of Berkshire and Commonwealth of Massachusetts, have invented certain new and useful Improvements in Portable Wood-Sawing Machines, a specification of which is as follows.

This invention relates to improvements in portable wood sawing machines, preferably a machine that is driven or operated by means of a gasolene or other vaporous engine or other suitable motive power. I do not limit myself, however, to the use of any specific motive power. I may, if desired, use an electric motor.

An object of my invention is to provide a machine of this character which can be readily carried from place to place by a single person as necessity requires, when it is to be used. A further object of my invention is to provide a machine which will permit the saw to be tilted or moved into different planes of adjustment as for example, the machine may be used for sawing logs into suitable short lengths, when they are substantially in a horizontal position, or it may be used for cutting down trees, in which case the saw would be operated in substantially a horizontal plane. With these and other objects in view, reference is made to the specification and drawings for a full description of the machine and to the claims, which will particularly point out my improvement.

Referring to the drawings:

Figure 1 is a general plan view showing the engine and connecting mechanism between the engine and saw blade.

Fig. 2 is a side elevational view of the apparatus showing the devices for clamping a log in place during the sawing operation, also the means for automatically moving or feeding the saw blade downward toward the log, and a partial view of the log clamping means.

Fig. 3 is an end elevational view showing means for permitting the tilting and clamping of the engine frame in different positions and Fig. 4 is a view showing the saw operating in a horizontal plane.

Fig. 5 is a detail of the dogging means.

Referring to the drawings in detail: 1 designates the main frame having the base or runner supporting portions 2, the forward ends of which are shown curved as indicated at 3, for assisting in moving the apparatus while being drawn along the surface of the ground, if desired. Secured to the frame-work 1 is a suitable engine or other motive power, preferably gasolene engine, the cylinder of which is indicated at 4, the fly wheel casing at 5. 6 is a drive shaft which is suitably connected to the crank shaft 6' of the engine by means of the cone clutch 7. This clutch is thrown into and out of engagement by means of the hand lever 8 which is pivotally secured to the frame work 9 at the point 10. A locking latch is shown at 11 and a holding sector at 12. The links 13 and 14 are connected to the lever 8 whereby the cone of the clutch is readily operated.

Secured to the outer end of the shaft 6 is a beveled gear 15 which meshes with the beveled gear 16 that drives the cross shaft 17, to the outer end of which is connected the crank arm 18. Attached thereto is a pitman or connecting rod 19 which is attached to the cross head or slide rod 20 that operates in the bearings 21 and 22, which are secured to the bar 22', the outer end of which bar turns about the shaft 17 as shown by the dotted lines in Fig. 2. The bar 22' is also connected to the block $22^2$ which is attached to an upright rack and forms a part of the bar 29. Attached to the cross or slide rod 20 is a link member 23, to the outer end of which is detachably secured the saw 24.

For the purpose of automatically feeding or moving the saw downward and holding it constantly in contact with the work or log indicated at 25, a worm 26 is placed on the shaft 6. This worm drives the worm gear 26' which is secured to the shaft 27 to which is secured the spur gear or pinion 28. This gear meshes with the rack bar 29, which is gradually fed or moved downward by the rotation of the shaft 27, which, as stated, is driven from the drive shaft 6. The dotted line position in Fig. 2 shows the rack bar after being moved downward from its normal position or full line position during the sawing operation as the saw blade advances through the log carrying with it the slide rod 20.

The bearing block 30 of the bar 22' turns about the shaft 17, as readily understood, during the sawing operations. The shaft 27, which operates the rack bar 29, is driven from the worm 26 though the cone clutch 31, the parts of which are held in operative position by means of the coiled spring 32. This clutch will slip should the saw strike any obstruction that would cause breakage. Any suitable mechanism may be employed for moving the cone clutch outward when it is desired to stop the downward feed of the saw blade, or to reset the same.

For the purpose of firmly clamping the log 25 in place while being cut, the sharp pointed pins 34 and the notched bar member 35 are employed. The bar member 35 is formed with a sharpened end 35' at its lower portion and engages the lower side of the log 25 to be clamped or held against movement. The pointed pins 34 are attached to the extension bars 34', which are slidably mounted in the side bars of the main frame 1. The bar 35 may be held in vertical adjustment by means of the pin 35² which passes through the casting 41 and engages one of the notches in the bar 35 after the part 35' is placed under the log 25. The log adjusting handle 38 is pivoted to the main frame work at 39. Connected to the handle 38 are links 40 which in turn are connected to the block member 41 that is attached to and turns with the rod 41' that is located in the main frame. A sector 42 is employed for locking the handle in different positions of adjustment, by means of the hook 43. The part 35 acts like a cant hook for moving the log. The parts just described are in position for sawing a log while resting in a horizontal position. The operation of securing the log in place is as follows: The machine as a whole is moved so that the sharp points 34 are placed on the log which is to be sawed. By means of the handle 38 the rack bar 35 with its sharpened lower end 35' is swung under the log; the links 40 being connected to the block 41 which is secured to the rockable shaft 41' permit the log to be raised after the pin 35² has been inserted in the block 41 and in engagement with one of the notches of the bar 35. The log is then securely retained by means of the latch 43 engaging the sector 42.

Should it be desired to sever a standing tree, the main frame is placed adjacent the tree and the engine 4 turned into a vertical position. This is permitted by means of the upright portion 44 of the frame which is provided with an arc shaped slot 45 therein. This permits the engine to be turned through any arc up to 90°. In Fig. 4 the machine is shown clamping the trunk of a tree and with the saw operating in a horizontal plane, while in the other figures of the drawings the saw is in a vertical plane. A thumb nut 46 is employed for retaining the frame in the upright position shown in Fig. 4.

From this construction it will be seen that the apparatus is readily adapted for carrying out the sawing operations when the work is in either a horizontal or vertical position and that the parts are so constructed that they may be readily adjusted for logs of various sizes and that the cylinder of the engine will always stand in a vertical position, which is desirable for obtaining perfect lubrication.

What I claim is:

1. In an apparatus for sawing wood, as logs or the like, the combination, of a main frame, means thereon for supporting and clamping the log in position for sawing, a saw blade, means for operating the blade comprising a suitable motor, a clutch construction between the motor and blade, means for moving the saw blade toward the work including a rack and pinion, said rack supporting one end of the connecting means of the blade, and yieldable means for operating the pinion from the motor, as described.

2. In a log sawing apparatus, the combination, of a main supporting frame, a motor thereon, a saw blade, connecting devices between the blade and the motor, and including a drive shaft, a cross shaft operated therefrom, a reciprocable rod connected to the blade for operating the same, a crank connecting said rod and cross shaft, a bar having one end pivotally connected to the main frame at a point coincident with the axis of the cross shaft for supporting the reciprocable rod, a reciprocable rack bar supporting the other end of said bar, a second cross shaft operable from the drive shaft and devices for operating the rack bar from the second cross shaft for automatically feeding the blade toward its work and simultaneously with its reciprocating movements.

3. In a wood sawing apparatus, the combination, of a main frame, means for securing a log, or the like, to the frame and including a rotatable shaft, a log engaging hook slidable relative to the shaft, means for adjustably securing the hook to the shaft, a slidable device in the frame for engaging the log at points which are oppositely located relative to the log engaging part of the hook, a device for rocking the shaft for lifting the log against the slidable device, and a device for adjustably securing the shaft rocking device in different adjustable positions.

EVERETT W. ADAMS.